(12) United States Patent
Ginder (10) Patent No.: US 11,746,036 B2
(45) Date of Patent: Sep. 5, 2023

(54) MOLTEN SALT ASSISTED PYROLYSIS RECYCLING OF GLASS FIBER REINFORCED POLYMER COMPOSITES

(71) Applicant: University of Tennessee Research Foundation, Knoxville, TN (US)

(72) Inventor: Ryan S. Ginder, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 306 days.

(21) Appl. No.: 16/674,738

(22) Filed: Nov. 5, 2019

(65) Prior Publication Data

US 2020/0140315 A1 May 7, 2020

Related U.S. Application Data

(60) Provisional application No. 62/755,613, filed on Nov. 5, 2018.

(51) Int. Cl.
| | |
|---|---|
| *C03B 37/01* | (2006.01) |
| *C03C 1/00* | (2006.01) |
| *B29B 17/04* | (2006.01) |
| *B29B 17/02* | (2006.01) |

(52) U.S. Cl.
CPC ............. *C03B 37/01* (2013.01); *B29B 17/02* (2013.01); *B29B 17/04* (2013.01); *C03C 1/002* (2013.01);
(Continued)

(58) Field of Classification Search
CPC ..... C03B 37/01; C03C 1/002; C03C 2203/10; C03C 2203/20; C03C 13/00;
(Continued)

(56) References Cited

U.S. PATENT DOCUMENTS

| 8,312,739 B2 | 11/2012 | Lee et al. |
| 10,072,358 B2 | 9/2018 | Da Cruz et al. |

(Continued)

FOREIGN PATENT DOCUMENTS

JP 2012086118 A * 5/2012

OTHER PUBLICATIONS

Cooper, A.R.; Krohn, D.A. Strengthening of glass fibers: Part 2, ion exchange. J. Am. Cemm. Soc. 1969, 52, 665-669. (Year: 1969).*

(Continued)

*Primary Examiner* — S. Behrooz Ghorishi
(74) *Attorney, Agent, or Firm* — Jenkins, Taylor & Hunt, P.A.

(57) ABSTRACT

A method of recycling glass fiber-reinforced polymer composite materials that can provide improved quality recycled glass fiber is described. More particularly, the method comprises pyrolysis of glass fiber-reinforced polymer composite scrap and/or end-of-life material and the subsequent immersion of the pyrolyzed glass fibers in a molten salt bath, e.g., comprising molten potassium nitrate. Immersion in the molten salt bath can eliminate char from the pyrolyzed fibers, as well as removing residual inorganic materials. In addition, immersion in the molten salt bath can strengthen the glass fiber, which can result in the recovery or avoidance of tensile strength losses normally incurred through traditional char removal processes.

17 Claims, 4 Drawing Sheets

(52) U.S. Cl.
CPC .. *B29B 2017/0496* (2013.01); *C03C 2203/10* (2013.01); *C03C 2203/20* (2013.01)

(58) Field of Classification Search
CPC ....... C03C 21/002; B29B 17/02; B29B 17/04; B29B 2017/0496; Y02P 20/143; Y02W 30/62; B29K 2105/12; C10B 53/07
See application file for complete search history.

(56) References Cited

U.S. PATENT DOCUMENTS

| | | | | |
|---|---|---|---|---|
| 2004/0173239 | A1* | 9/2004 | Grove-Nielsen | C10B 53/07 134/2 |
| 2005/0066573 | A1* | 3/2005 | Cooper | B29B 17/02 44/607 |
| 2011/0028308 | A1* | 2/2011 | Shah | C04B 26/10 502/159 |
| 2011/0045275 | A1* | 2/2011 | Tadepalli | C03C 13/00 428/300.1 |
| 2015/0184079 | A1* | 7/2015 | Riedewald | C10B 11/00 201/25 |
| 2021/0237317 | A1* | 8/2021 | Dubois | B29B 17/0206 |

OTHER PUBLICATIONS

Cunliffe et al., "Characterization of products from the recycling of glass fibre reinforced polyester waste by pyrolysis." Fuel, vol. 82, pp. 2223-2230 (2003).

Cunliffe et al., "Pyrolysis of Composite Plastic Waste." Environ. Technol., vol. 24, pp. 653-663 (2003).

Thomason et al., "Glass Fibre Strength—A Review with Relation to Composite Recycling." Fibers, vol. 4(2), Article No. 18 (2016).

Cunliffe, A.M.; et al., (2003), "Pyrolysis of Composites Plastic Waste," Environ. Technol., 24, pp. 653-663.

Feih, S., et al., (2015) "Determining the mechanism controlling glass fibre strength loss during thermal recycling of waste composites," Compos. Part. A Appl. Sci. Manuf., 76, pp. 255-261.

Feih, S.; et al., (2009) "Strength degradation of glass fibers at high temperatures," J. Mater. Sci., 44, pp. 392-400.

Ginder, R.S.; et al., (2019) "Recycling of Commercial E-glass Reinforced Thermoset Composites via Two Temperature Step Pyrolysis to Improve Recovered Fiber Tensile Strength and Failure Strain," Recycling, 4, 24; 12 Pages.

Ginder, R.S.; et al., (2019) "Degradation of E-glass fiber mechanical properties during composite sheet modling compound production for automotive applications," MRS Comm; 5 Pages.

Griffith, M et al., (1920) "VI. The Phenomena of Rupture and Flow in solids," pp. 163-198.

Karlsson, S.; et al., (2010) "The Technology of Chemical Glass Strengthening," A Review. Glass Tech. Euro. J. Glass Sci. Tech. Part A, 51, pp. 41-54.

Varshneya, A.K. (2010) "Chemical Strengthening of Glass: Lessons Learned and Yet To Be Learned.," Appl. Glass Sci., 1, pp. 132-142.

\* cited by examiner

MOLTEN SALT ASSISTED PYROLYSIS RECYCLING OF GLASS FIBER REINFORCED POLYMER COMPOSITES

RELATED APPLICATIONS

This application claims the benefit of U.S. Provisional Patent Application Ser. No. 62/755,613, filed Nov. 5, 2018; the disclosure of which is incorporated herein by reference in its entirety.

TECHNICAL FIELD

The presently disclosed subject matter relates in some embodiments to a method of recycling a glass fiber reinforced polymer composite material to provide recycled glass fibers.

Abbreviations

%=percentage
° C.=degrees Celsius
μm=micrometer
FRP=fiber-reinforced polymer
GFRP=glass fiber-reinforced polymer
$KNO_3$=potassium nitrate
min=minutes
mm=millimeter
MPa=megapascal
RGF=recycled glass fiber

BACKGROUND

Fiber-reinforced composite materials (e.g., fiber-reinforced polymer (FRP) composites) are widely used in a variety of applications, e.g., automotive body parts, airplane parts and other aerospace-related components, boat hulls, construction materials for buildings and/or infrastructure (e.g., bridges, roadways, tunnels, sewers, etc.), panels for bathtubs, swimming pools, hot tubs, storage tanks, pipes (e.g., undersea pipe sections) and/or pipe fittings, sporting equipment (e.g., golf clubs, fishing rods, bicycle parts, or baseball bats), personal safety equipment (e.g., bullet proof vests), and in the energy industry (e.g., as blades for wind turbines). While carbon, aramid, and basalt fibers have also been used in fiber-reinforced composite materials, glass fibers are a popular reinforcement. For example, in 2015, over 10 million tons of fiber reinforced composites were produced, at least 90% of which was reinforced with E-glass fiber. See Thomason et al., Fibers, 4(2): 18 (2016).

The production and use of fiber-reinforced composite materials has resulted in the need for better ways to dispose of composite manufacturing waste (including scrap composite material) and end-of-life composite parts. Growing regulatory barriers and tipping fees make landfilling these materials less attractive. See Thomason et al., Fibers, 4(2): 18 (2016). Further, recycling of the composite materials can divert waste into new value-added products.

In particular, glass fiber can be extracted for recycling from the polymeric matrix material of glass fiber-reinforced polymer (GFRP) composites, which can include polymeric matrixes comprising thermosetting polymeric materials, such as epoxy, polyester, vinyl ester, or phenol formaldehyde materials, or thermoplastic materials, such as polyolefins (e.g., polypropylene (PP), polyamides, polycarbonates, etc. However, current recycling methods can result in a significant drop in the performance and value of the recycled glass fibers as compared to virgin glass fibers (i.e., glass fibers not previously used as reinforcement materials in a composite), making the reuse of recycled glass fibers (RGFs) in new composites less attractive.

Accordingly, there is an ongoing need for additional methods of recycling composite materials comprising glass fibers, particularly where the recycling method can provide RGFs with sufficient mechanical properties for reuse in composite materials production and/or mechanical properties more similar to virgin glass fiber than current RGFs.

SUMMARY

In some embodiments, the presently disclosed subject matter provides a method of recycling a glass fiber reinforced polymer composite material, the method comprising: (a) providing a composite material comprising a glass fiber embedded in a thermoset or thermoplastic polymeric matrix; (b) heating the composite material to a temperature of at least about 350° C. for a first period of time under vacuum or an inert atmosphere to gasify the thermoset or thermoplastic polymeric matrix, thereby providing (i) one or more gas and (ii) a solid mixture comprising pyrolyzed glass fiber and a char residue of the thermoset or thermoplastic polymeric matrix; (c) immersing the solid mixture in a molten salt bath comprising molten potassium nitrate ($KNO_3$) for a second period of time to provide a molten salt recovered glass fiber; and (d) rinsing the molten salt recovered glass fiber with water or an aqueous solution, thereby providing recycled glass fiber. In some embodiments, the composite material is scrap composite material or end-of-life composite material. In some embodiments, the composite material is scrap composite from the production of a wind turbine blade or an end-of-life wind turbine blade.

In some embodiments, the composite material comprises a glass fiber embedded in a thermoset polymer matrix. In some embodiments, the thermoset polymer matrix comprises an epoxy or a polyester. In some embodiments, the glass fiber is E-glass fiber.

In some embodiments, step (b) is conducted at a temperature of between about 450° C. and about 650° C. In some embodiments, the first period of time is at least about 30 minutes.

In some embodiments, the molten salt bath further comprises one or more additional potassium salt. In some embodiments, the second period of time is at least about 30 minutes. In some embodiments, the second period of time is between about 30 and about 40 minutes.

In some embodiments, the second period of time is between about 60 minutes and about 120 minutes. In some embodiments, the molten salt recycled glass fiber has a tensile strength that is at least about 90% of a tensile strength of the pyrolyzed glass fiber. In some embodiments, the molten salt recycled glass fiber has a failure strain that is equal to or higher than a failure strain of the pyrolyzed glass fiber.

In some embodiments, the composite material provided in step (a) is subjected to a mechanical size reduction process prior to step (b).

In some embodiments, the aqueous solution comprises one or more sizing and/or finishing agents. In some embodiments, the one or more sizing and/or finishing agents comprise an alkoxysilane. In some embodiments, the one or more sizing and/or finishing agents comprise a film forming agent and/or an additive.

In some embodiments, the presently disclosed subject matter provides a recycled glass fiber produced by a method comprising: (a) providing a composite material comprising a glass fiber embedded in a thermoset or thermoplastic polymeric matrix; (b) heating the composite material to a temperature of at least about 350° C. for a first period of time under vacuum or an inert atmosphere to gasify the thermoset or thermoplastic polymeric matrix, thereby providing (i) one or more gas and (ii) a solid mixture comprising pyrolyzed glass fiber and a char residue of the thermoset or thermoplastic polymeric matrix; (c) immersing the solid mixture in a molten salt bath comprising molten $KNO_3$ for a second period of time to provide a molten salt recovered glass fiber; and (d) rinsing the molten salt recovered glass fiber with water or an aqueous solution, thereby providing the recycled glass fiber.

In some embodiments, the presently disclosed subject matter provides a glass fiber-reinforced composite material comprising: (a) a recycled glass fiber produced by a method comprising: (i) providing a composite material comprising a glass fiber embedded in a thermoset or thermoplastic polymeric matrix; (ii) heating the composite material to a temperature of at least about 350° C. for a first period of time under vacuum or an inert atmosphere to gasify the thermoset or thermoplastic polymeric matrix, thereby providing (1) one or more gas and (2) a solid mixture comprising pyrolyzed glass fiber and a char residue of the thermoset or thermoplastic polymeric matrix; (iii) immersing the solid mixture in a molten salt bath comprising molten $KNO_3$ for a second period of time to provide a molten salt recovered glass fiber; and (iv) rinsing the molten salt recovered glass fiber with water or an aqueous solution, thereby providing the recycled glass fiber; and (b) a thermoset of thermoplastic polymeric matrix.

Accordingly, it is an object of the presently disclosed subject matter to provide a method of recycling a glass fiber-reinforced polymer composite material, as well as the recycled glass fibers provided thereby, and the composite materials made from the recycled glass fibers.

An object of the presently disclosed subject matter having been stated hereinabove, and which is achieved in whole or in part by the presently disclosed subject matter, other objects will become evident as the description proceeds herein below.

DETAILED DESCRIPTION

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. DEFINITIONS

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, weight, concentration, volume, strength, strain, length, width, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4).

The term "pyrolysis" and variations thereof refer to thermolysis of organic polymer materials in the absence of oxygen ($O_2$). The process yields hydrocarbon gases and liquids with significant energy content. Typical pyrolysis temperatures are between about 350° C. and about 800° C. In some embodiments, pyrolysis is conducted in a furnace under an inert atmosphere (e.g., nitrogen or argon) or under vacuum at between about 450° C. and about 600° C. The hydrocarbon gases and liquids can be removed from the furnace and any remaining carbonaceous solid residue (i.e., "char") and pyrolyzed inorganic materials (i.e., inorganic materials that had been exposed to the pyrolysis process) recovered.

As used herein, a "monomer" refers to a non-polymeric molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

As used herein the terms "polymer", "polymeric" and "polymeric matrix" refer to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units. A "copolymer" refers to a polymer derived from more than one species of monomer.

The term "thermoplastic" can refer to a polymer that softens and/or can be molded above a certain temperature, but which is solid below that temperature. Thermoplastic polymers include, but are not limited to, ethylene vinyl acetate copolymers (EVA), polyolefins (e.g., polypropylene (PP)), polyamides, some polyesters (e.g., polybutylene terephthalate (PBT)), styrene block copolymers (SBCs), polycarbonates, silicone rubbers, fluoropolymers, thermoplastic elastomers, polypyrrole, polycaprolactone, polyoxymethylene (POM), and mixtures and/or combinations thereof.

The terms "thermoset" and "thermosetting" refer to a polymer that is irreversibly solidified when polymer precursors (e.g., monomers and/or oligomers, which can also be referred to as "resins" or "pre-polymers") react with one another when exposed to heat, suitable radiation (e.g., visible or ultraviolet light), and/or suitable chemical conditions (e.g., the addition of a chemical polymerization initiator or catalyst (e.g. a peroxide) and/or exposure to suitable pH conditions (such as brought about by the addition of an acid or base)). Thermoset polymers include, but are not limited to, epoxys, polyesters, vinyl esters, phenol formaldehyde systems (e.g., Bakelite), polyurethanes, polyurea/polyurethane hybrids, cyanoacrylates, acrylic polymers (e.g., methacrylates), and mixtures and/or combinations thereof.

The term "resin" when used with regard to a thermosetting polymer can refer to a mixture of the polymer precursors that are further polymerized and/or crosslinked during curing. The term "resin" can also be used herein to refer to monomers, oligomers, and/or mixtures thereof that can be polymerized to form a thermoplastic polymer.

The terms "cure", "curing", and "cured" as used herein can refers to the hardening of a thermoplastic polymer or to the formation of a solid thermoset or thermoplastic polymer from its precursors (e.g. via cross-linking of polymer chains in a thermoset polymer resin). Curing can be done thermally, chemically, or via application of ionizing radiation, such as but not limited to electron beam, x-ray, gamma, photo with photo initiators, and/or ultraviolet (UV)).

The term "oriented" as used herein refers to a non-random arrangement of a plurality of glass fibers. The orientation of the fibers can be unidirectional (i.e., wherein all longitudinal axis of the fibers are all orientated in the same direction), bidirectional (wherein the longitudinal axis of some of the fibers is at a 90° angle to the axis of the other fibers), between a uni- and bidirectional orientation, or combinations thereof (e.g., where there are multiple layers of fibers of differing orientation).

II. GENERAL CONSIDERATIONS

As described hereinabove, the widespread use of glass fiber-reinforced polymer (GFRP) composites (i.e., composite materials comprising glass fibers embedded in a polymeric matrix material) has led to large amounts of glass fiber-reinforced polymer manufacturing waste and end-of-life materials. Recycling processes for GFRP composite materials currently in use typically involve collecting materials for recycling, a mechanical size reduction step (e.g., cutting or shredding the collected materials to smaller sizes that can be more easily fed into a pyrolysis reactor), and a pyrolysis step, which removes the polymeric resin and provides hydrocarbon gases (e.g., methane, ethane, ethylene, propane, propylene, etc.) and liquids with high energy content. The pyrolysis process also leaves behind pyrolyzed fibers, i.e., fibers that have been exposed to the pyrolysis process and which are typically coated and/or mixed with char (i.e., solid carbonaceous residue remaining from the polymer matrix material), as well as any inorganic fillers that were present in the original glass fiber-reinforced polymer composite, such as, but not limited to calcium carbonate.

Unfortunately, exposure to the high temperatures used in pyrolysis processes causes the tensile strength of glass fibers to decline. For instance, exposure to typical pyrolysis temperatures of between about 400° C. and about 650° C. can result in, on average, an about 40% drop in the average tensile strength of the fibers. See Cunliffe et al., Environ. Technol., 24: 653-663 (2003). This strength loss can limit the economic viability of using recycled glass fiber.

In addition, for the glass fiber to be suitable for reuse (e.g., in a new composite), the char and other solids need to be removed. Char removal is usually performed by taking the pyrolyzed fibers and exposing them to high temperatures (e.g., 500° C.) in oxygen ($O_2$) to burn off the carbon-based char, which results in further reduction of tensile strength. Then, removal of the remaining ash and other inorganics is performed via mechanical sieving, which can reduce fiber yield due to the breaking of low strength fibers. Accordingly, the glass fibers typically produced by current recycling methods can be low strength, low value and contain remaining impurities. See Cunliffe et al., Fuel, 82: 2223-2230 (2003).

The presently disclosed subject matter provides, in some embodiments, a method of recycling GFRP composites wherein, instead of burning off char in an oxygen environment, pyrolyzed fiber is immersed in a molten salt bath, e.g., comprising molten $KNO_3$ and optionally other salts (e.g., other potassium salts), to remove char and other impurities from the pyrolysis process. In addition, immersion in the molten salt bath can increase the strength of the glass fibers, thereby reducing or eliminating the tensile strength losses associated with traditional char removal processes involving oxidation at high temperature.

More particularly, the immersion of glass fibers in molten salt baths can result in ion exchange, wherein a smaller cation in a surface layer of the glass fiber is exchanged for a larger cation of the same valence or oxidation state. By way of example, sodium ions in a surface layer of a glass fiber can be replaced by potassium ions from a molten salt bath, though other alkali metal ions having a larger atomic radius, such as rubidium (Rb) or cesium (Cs), or metal ions other than alkali metal ions (e.g., $Ag^+$ ions) can also replace smaller alkali metal ions in the glass. The replacement of smaller ions by larger ions at a temperature below that at which the glass network can relax can produce a distribution of ions in the surface layer of the glass fiber that results in a compressive force. However, while ion exchange process has been shown to strengthen virgin glass fibers and other materials, immersing pyrolyzed glass fibers in molten salt baths can result in many different chemical reactions occurring at the surface of the glass fibers as the char is removed. These reactions can also generate additional heat. Thus, prior to the presently disclosed subject matter, it was unclear how the presence of char on the pyrolyzed fibers would affect strengthening, or if any strengthening effect would be enough to offset weakening caused during pyrolysis, particularly as glass fiber strength can be sensitive to surface defects and/or surface chemistry. In addition, the glass strengthening effect of molten salt baths is fairly weak, as it is limited in the depth of the ion exchange compressive layer that can be formed on the surface of the glass, further adding to the question of whether or not any strengthening effect from molten salt bath treatment would be able to offset strength degradation mechanisms that occur during pyrolysis.

Figure 1A:
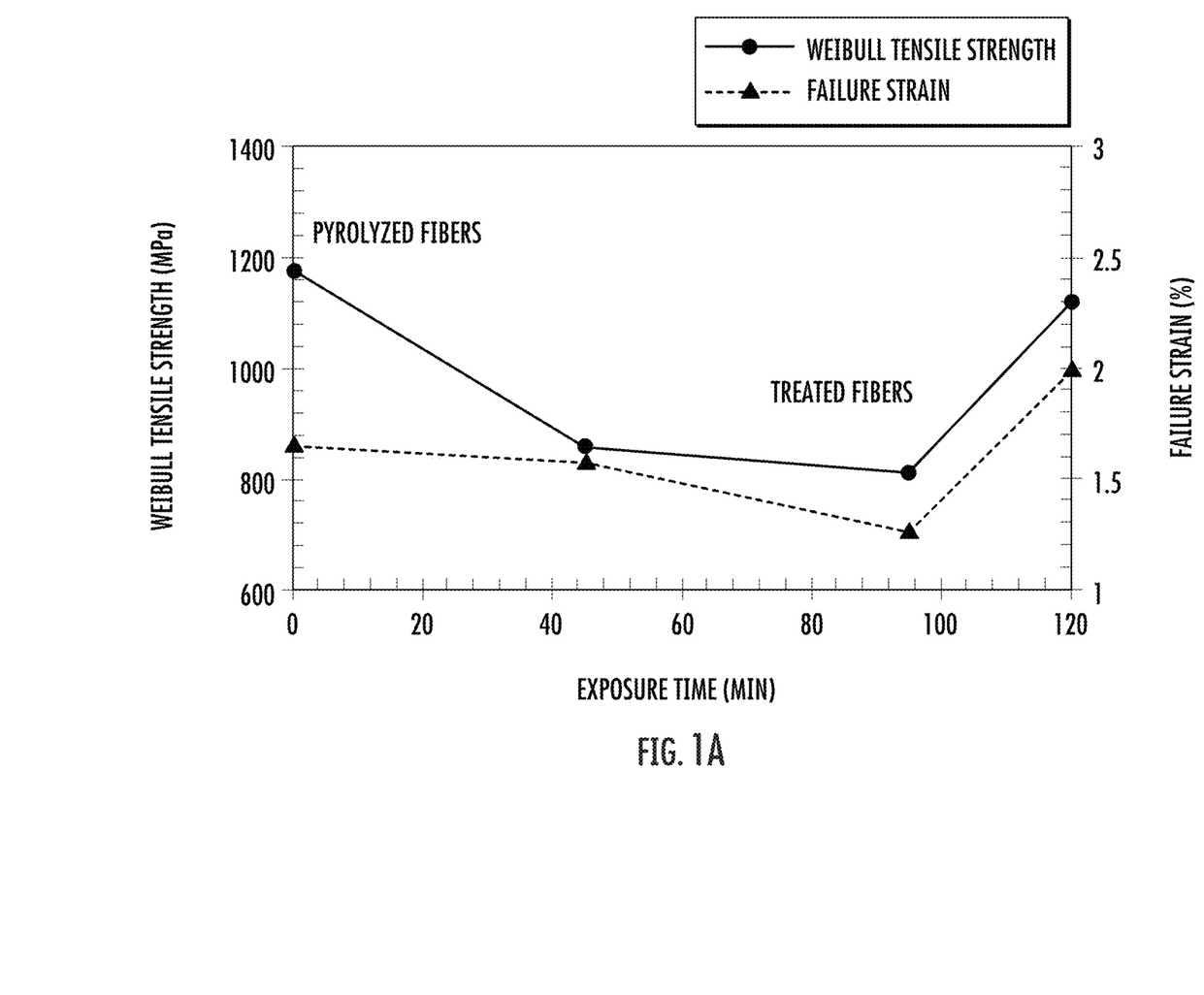
FIG. 1A is a graph showing the effects of molten salt bath exposure time (in minutes) on the Weibull tensile strength (solid line, measured in megapascals) and failure strain (dashed line, measured as percent (%)) of pyrolyzed glass fibers.

As described herein, it has been surprisingly found that, although immersion of pyrolyzed glass fibers in a molten salt bath comprising $KNO_3$ can lead to an initial additional loss of tensile strength when the fibers are immersed in the bath, after longer immersion times, the tensile strength of the pyrolyzed glass fibers starts to increase. See FIG. 1A. While this increase eventually levels off, the use of the molten salt bath can result in the recovery of pyrolyzed glass fibers from GFRP composites having similar tensile strength to the pyrolyzed glass fibers prior to char removal. As shown in FIG. 1A, immersion in the molten salt bath can also result in a similar initial decrease in failure strain, followed by an increase in failure strain with longer immersion times, resulting in a failure strain even higher than that of the initial pyrolyzed glass fiber. In addition, use of the molten salt bath appears to provide a degree of heat resistance to the recycled glass fibers. See FIG. 1B.

Accordingly, in some embodiments, the presently disclosed subject matter provides a method of recycling a glass fiber-reinforced polymer (GFRP) composite material (and/or of recovering/recycling the glass fiber from a GFRP composite), wherein the method comprises: (a) providing a composite material comprising a glass fiber embedded in a thermoset or thermoplastic polymeric matrix; (b) heating the composite material to a temperature of at least about 350° C. for a first period of time under vacuum or an inert atmosphere to gasify the thermoset or thermoplastic polymeric matrix, thereby providing (i) one or more gas and/or liquid; and (ii) a solid mixture comprising pyrolyzed glass fiber and a char residue of the thermoset or thermoplastic polymeric matrix; (c) immersing the solid mixture in a molten salt bath comprising molten potassium nitrate ($KNO_3$) for a second period of time to provide a molten salt recovered glass fiber; and (d) rinsing the molten salt recovered glass fiber with water or an aqueous solution, thereby recycling the composite and/or providing recycled glass fiber.

Figure 2A:
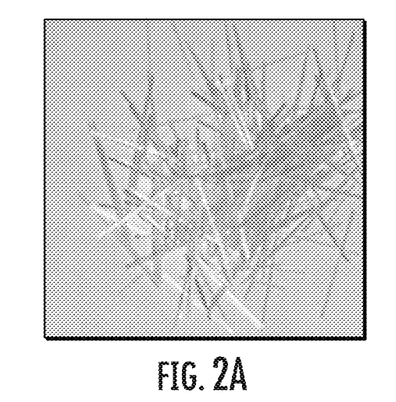
FIG. 2A is a photographic image of virgin glass fibers.
Figure 2B:
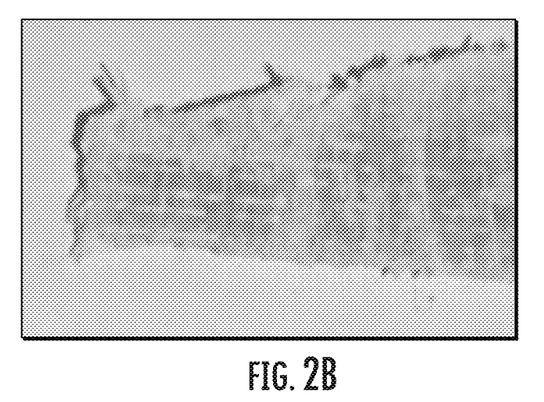
FIG. 2B is a photographic image of glass fiber-reinforced polymer (GFRP) composite scrap material.

In some embodiments, providing the composite material can comprise collecting waste composite material, such as scrap composite material from a composite manufacturing process or from a manufacturing process utilizing composite material as a product component. Such materials can also include, for example, rejected parts. Additionally or alternatively, the composite material can be used, end-of-life composite materials. FIG. 2B shows a photograph of exemplary GFRP composite scrap. As described hereinabove, glass fiber-reinforced composite materials have applications in many different industries. Thus, the end-of-life or scrap materials can include, but are not limited to, end-of-life GFRP composite materials from boats, planes, spacecraft, cars, trucks, bicycles, motorcycles, snowmobiles, wall panels and/or insulation, sporting equipment (e.g., golf clubs, etc.), hot tubs, swimming pools, pipe fittings, pipe sections, storage tanks, and wind turbines and/or scrap materials from the manufacture thereof. In some embodiments, the composite material is scrap composite from the production of a wind turbine blade or an end-or-life wind turbine blade.

The thermoset or thermoplastic polymeric matrix can comprise any thermoset or thermoplastic polymeric matrix used in the manufacture of GFRP composites, such as, but not limited to epoxys, polyesters, vinyl esters, polyamides, POM, PP, polycarbonates and PBT. In some embodiments, the GFRP composite comprises a thermoset polymer matrix. In some embodiments, the thermoset polymer matrix comprises epoxy, polyester, vinyl ester, of phenol-formaldehyde polymers.

The glass fiber embedded in the polymeric matrix can be any suitable glass fiber. Thus, the glass fiber can comprise any suitable silica-based material, such as alumino-silicate, alumino-lime silicate, alumino-borosilicate, alkali-lime glass, etc. In some embodiments, the glass fiber is E-glass fiber, i.e., an alumino-borosilicate material comprising less than 1% by weight alkali oxides. FIG. 2A is a photographic image showing virgin E-glass typical of that used for the production for glass-reinforced fibers. However, the glass fibers can include or consist of other types of glass fibers known in the composites field, such as, but not limited to, A-glass, C-glass, D-glass, R-glass, S-glass, E-CR-glass, fused quartz, etc. The glass fiber in the composite can be woven or non-woven, oriented or random, chopped or non-chopped. Typical glass fiber diameters for GFRP applications are between about 9 and about 17 micrometers (μm). The length of the glass fibers can vary. In some embodiments, the length of the glass fiber is between about 3 and about 26 millimeters (mm). In some embodiments, the length of the glass fibers is shorter (e.g., between about 0.2 and about 0.3 mm).

In some embodiments, the composite material provided in step (a) is subjected to a mechanical size reduction process prior to step (b), e.g., so that the material is easier to handle and/or so that the material is of a more uniform and/or smaller size, thus providing more efficient pyrolysis. Mechanical size reduction processes can include, but are not limited to, chopping, cutting, shredding, grinding, sieving, and combinations thereof. In some embodiments, the material can be passed into a chamber comprising a rotor and a plurality of stators and from the chamber through a mesh or sieve, wherein the stators act as knives to cut up the material.

The size of the reduced size composite material can be tailored to provide pieces with a surface area to volume ratio that can be pyrolyzed in a suitable length of time and that provide recycled fibers of useful length (e.g., that are long enough to provide reinforcement if reused in a composite, while not being so long that they become hard to reprocess). Thus, in some embodiments, the composite material is subjected to a mechanical size reduction process to provide composite material pieces having a size (i.e., a length, width and/or height) between about 0.25 inches and about 2 inches (between about 6 mm to about 51 mm). In some embodiments, the composite material is reduced in size to an average length, width and/or height of between about 1 inch and about 2 inches.

The above-mentioned step (b) can be carried out in any structure that can withstand heating to a suitable pyrolysis temperature and that can provide an oxygen-free environment. Suitable reactors for conducting the pyrolysis of FRP composites are known in the art. Suitable pyrolysis temperatures and rates can vary depending upon the identity of the polymeric matrix present in the composite material and/or the desired composition of any gas and/or liquid products of the pyrolysis process. In some embodiments, step (b) is conducted at a temperature of between about 350° C. and about 800° C. In some embodiments, step (b) is conducted at a temperature of between about 450° C. and about 650° C. (e.g., at about 450, 475, 500, 525, 550, 575, 600, 625, or about 650° C.). In some embodiments, (e.g., to limit thermally induced damage to the glass fibers), step (b) can be conducted at a maximum temperature of between about 500° C. and about 600° C. In some embodiments, step (b) is conducted under a nitrogen atmosphere. The first period of time can be any amount of time sufficient to substantially pyrolyze the polymeric matrix from the composite material. In some embodiments, the first period of time is at least about 30 minutes. In some embodiments, the first period of time is between about 30 minutes and about 240 minutes (e.g., about 30, 45, 60, 75, 90, 105, 120, 135, 150, 165, 180, 195, 210, 225, or about 240 minutes). In some embodiments, the first period of time is about 60 minutes. Gases and liquids produced during step (b) can be removed and, if desired, condensed and collected to burn to provide fuel (e.g., to provide the energy to heat the pyrolysis reactor and/or in unrelated applications) or used as chemical feedstock.

Figure 2C:
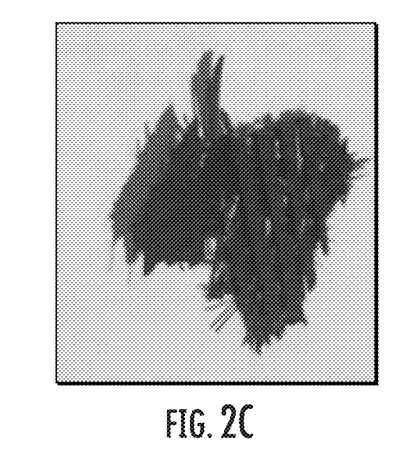
FIG. 2C is a photographic image of a solid mixture produced from pyrolysis of the scrap material shown in FIG. 2B, comprising pyrolyzed glass fibers coated with char.

The solids remaining after pyrolysis typically comprise pyrolyzed fibers coated with a layer of char, as well as inorganic solids which were present in the composite material as filler. Such filler materials include, but are not limited to, calcium carbonate, aluminum trihydrate, kaolin, talc, wollastonite ($CaSiO_3$), glass beads, mica, silica, barium sulfate, magnesium sulfate, diatomaceous earth, titanium dioxide, zinc oxide, and magnetite. FIG. 2C shows a photograph of exemplary pyrolyzed fibers coated with char. Such solids can be recovered from the pyrolysis reactor and immersed in a molten salt bath.

In some embodiments, e.g., if the recovery of the inorganic filler solids is desired, the solids can undergo an initial separation process prior to immersion of the pyrolyzed fibers in the molten salt bath. For example, the solids can be subjected to a cyclonic separation to separate at least some of the loose filler particles/dust from the heavier glass fiber. Such a separation process can be desirable, for example, when the composite material is a sheet molding compound (SMC) or other composite comprising a relatively large concentration of filler, e.g., to reduce the amount of inorganic contaminant in the molten salt bath. In some embodiments, the solids from the pyrolysis are immersed in the molten salt bath without any separation of glass fibers from inorganic filler particles.

As indicated above, the molten salt bath comprises molten $KNO_3$. The term "molten" as used herein refers to a salt bath wherein salt is present, at least partially, in liquid form. In some embodiments, the molten salt bath can include salts with anions other than nitrate, such as a halide or a sulfate. Thus, in some embodiments, the molten salt bath can comprise $KNO_3$, as well as one or more additional potassium salt, e.g., a potassium halide, such as potassium chloride, and/or potassium sulfate. In some embodiments, the molten salt bath can also comprise salts with other cations, including, but not limited to sodium nitrate, rubidium nitrate, cesium nitrate, silver nitrate, etc. In some embodiments, the presence of other components (i.e., other than $KNO_3$) in the molten salt bath can help to keep the temperature in a desired range. In some embodiments, the molten salt bath consists of $KNO_3$.

$KNO_3$ has a melting temperature of about 334° C., but can undergo thermal decomposition above about 550° C. Thus, in some embodiments, the molten salt bath can have a temperature of at least about 334° C. but less than about 550° C. In some embodiments, the molten salt bath can have a temperature of at least about 350° C. or at least about 375° C. In some embodiments, the temperature of the molten salt bath is between about 400° C. and about 500° C. (e.g., about 400, 410, 420, 430, 440, 450, 460, 470, 480, 490, or about 500° C.). In some embodiments, the temperature of the molten salt bath is about 450° C.

Reactions of the molten salt remove the layer of char from the surface of the pyrolyzed glass fiber. This process can be relatively rapid. For example, removal of the char layer can be completed in the first thirty to forty minutes of immersion in the molten salt bath. Thus, in some embodiments, the second period of time is at least the time required for removal of the char layer or at least about 30 minutes. In order to increase throughput in the recycling process, the second period of time can be limited to that required to remove the char. Thus, in some embodiments, the second period of time can be between about 30 minutes and about 40 minutes (e.g., 30, 31, 32, 33, 34, 35, 36, 37, 38, 39, or about 40 minutes).

However, as described above, immersion in the molten salt bath for longer periods of time can result in a strengthening effect in the glass fibers. Thus, in some embodiments, it can be advantageous to immerse the pyrolyzed glass fibers in the molten salt bath for periods of time longer than 40 minutes, to provide a pyrolyzed glass fiber that is not only free of char, but which also benefits from the strength increase effects observed with longer salt bath immersion times. Accordingly, in some embodiments, the immersion time can be increased to provide a higher quality recycled, pyrolyzed glass fiber. In some embodiments, the second period of time is at least about 60 minutes, at least about 90 minutes, or at least about 120 minutes. In some embodiments, the second period of time is between about 60 minutes and about 6 hours. In some embodiments, the second period of time is between about 60 minutes and about 4 hours. In some embodiments, the second period of time is between about 60 minutes and about 180 minutes. In some embodiments, the second period of time is between about 60 minutes and about 120 minutes (e.g., about 60, 65, 70, 75, 80, 85, 90, 95, 100, 105, 110, 115, or about 120 minutes).

In some embodiments, the pyrolyzed glass fibers can be immersed in a molten salt bath comprising molten sodium nitrate ($NaNO_3$) prior to immersion in the molten salt bath comprising $KNO_3$ to enrich the amount of sodium ions present in the surface layer of the glass fibers. The molten sodium nitrate bath can also remove the char layer from the pyrolyzed glass fibers. In some embodiments, the pyrolyzed glass fibers can be immersed in a molten $NaNO_3$ bath for at least about 20 minutes, at least about 30 minutes, or at least about 40 minutes, prior to immersion in the molten salt bath comprising $KNO_3$. In some embodiments, the pyrolyzed glass fibers can be immersed in the molten $NaNO_3$ bath for up to about 1 hour, 2 hours, or about 3 hours prior to immersion in the molten salt bath comprising $KNO_3$.

Figure 2D:
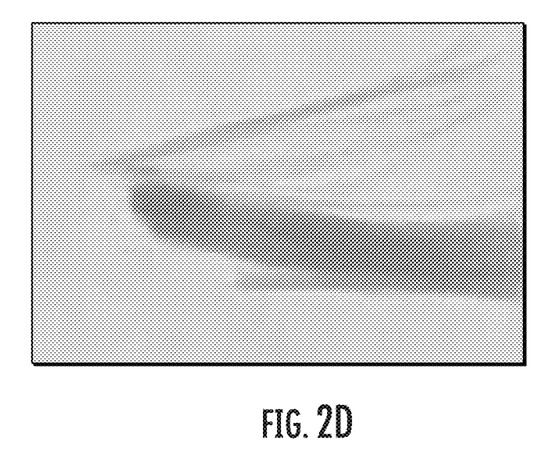
FIG. 2D is a photographic image of recycled glass fiber (RGF) produced by immersing the solid mixture shown in FIG. 2C in a molten salt bath and rinsing the recovered glass fiber with water.

After immersion in the molten $KNO_3$ bath (i.e., after the second period of time), the pyrolyzed glass fibers can be collected from the molten salt bath and rinsed to remove any residual salt or other remaining debris. The pyrolyzed glass fibers recovered from the molten salt bath can be referred to as "molten salt recovered glass fiber." FIG. 2D shows a photograph of molten salt recovered and rinsed glass fiber (i.e., a recycled glass fiber (RGF)) prepared according to the presently disclosed subject matter.

In some embodiments, the rinse can be performed with water alone. In some embodiments, the molten salt recovered glass fiber and/or RGF has a tensile strength that is at least about 90% of a tensile strength of the pyrolyzed glass fiber (e.g., at least about 90, 91, 92, 93, 94, 95, 96, 97, 98, or 99% of the tensile strength of the pyrolyzed glass fiber prior to the molten salt immersion). In some embodiments, the molten salt recovered glass fiber and/or RGF has a failure strain that is equal to or higher than a failure strain of the pyrolyzed glass fiber. In some embodiments, the molten salt recovered glass fiber and/or RGF can have a failure strain that is about 100, 105, 110, 115, 120, or about 125% of the failure strain of the pyrolyzed glass fiber prior to immersion in the molten salt bath. In some embodiments, the molten salt recovered glass fiber and/or RGF is heat resistant. For example, in some embodiments, the molten salt recovered glass fiber and/or RGF shows less than about 10%, less than about 5%, less than about 4%, less than about 3%, less than about 2%, less than about 1%, or 0% tensile strength loss when heated to 450° C. in air for up to about 20 minutes.

In some embodiments, e.g., to further improve the tensile strength or processability of the RGF, the molten salt bath recovered glass fiber can be rinsed in an aqueous solution comprising one or more sizing and/or finishing agents. Any suitable sizing and/or finishing agent as would be apparent to one having ordinary skill in the art upon a review of the instant disclosure can be used. For example, the sizing and/or finishing agents can include a coupling agent, a film forming agent, and/or an additive. Coupling agents include, for example, aminosilane-based agents, epoxysilane-based agents, vinylsilane-based agents, methacrylosilane-based agents, ureidosilane-based agents, boran-based agents, titanate-based agents, aluminum-based agents, chromium-based agents, and zirconium-based agents; as well as colloidal gels such as colloidal silica and colloidal alumina. In some embodiments, the coupling agent is an alkoxysilane. In some embodiments, the alkoxysilane is an aminoalkyltrialkoxysilane, such as a compound selected from the group including, but not limited to, γ-aminopropyltriethoxysilane, γ-aminopropyltrimethoxysilane, γ-(2-aminoethyl)amiopropyltriethoxysilane, and the like.

Suitable film forming agents include resins similar to the type of resin into which the recycled glass fiber is intended to be embedded to make a new GFRP composite material. Thus, film forming agents include, but are not limited to, epoxy and polyester resins, polyurethane resins, acrylic resins, polyvinylalcohol, diisocyante-blocked ethylene oxide or propylene oxide copolymers, polyvinylpyrrolidone, dicyanformaldehyde resin, gelatin, etc.

Additives include, but are not limited to, lubricants, antioxidants, antistatic agents, friction reducers, and pH adjusters. Examples of friction reducers include, but are not limited to, hydrogenated cured animal or vegetable oils, paraffin wax, and ester-type synthetic oils. Examples of lubricants include, but are not limited to, butyl stearate, tetraethylenepentamine distearate, hydrogenated castor oil, imidazoline-based fatty acid amides, cationic fatty acid amides, cationic polyethyleneimine polyamide, and bisphenol A poly(oxyethylene) ether glycol. Examples of antistatic agents include various surfactants such as anionic surfactants, cation surfactants, and nonionic surfactants. Examples of pH adjusters include, but are not limited to, ammonia and acetic acid.

In some embodiments, the presently disclosed subject matter provides a RGF produced by the presently disclosed method. In some embodiments, the RGF is heat resistant (e.g., shows less than about 10%, less than about 5%, or about 0% tensile strength loss when heated to 450° in air for up to about 20 minutes). Such RGFs can be suitable for reuse in preparing new composite materials, e.g., comprising either thermoset or thermoplastic polymeric matrices. Thus, in some embodiments, the presently disclosed subject matter provides a GFRP composite material comprising (a) a RGF produced by the presently disclosed method and (b) a thermoset or polymeric matrix. In some embodiments, the GFRP composite comprises glass fiber comprising at least about 25%, at least about 50%, at least about 75%, at least about 80%, at least about 85%, at least about 90%, at least about 95% or about 100% RGF of the presently disclosed subject matter.

Figure 3:
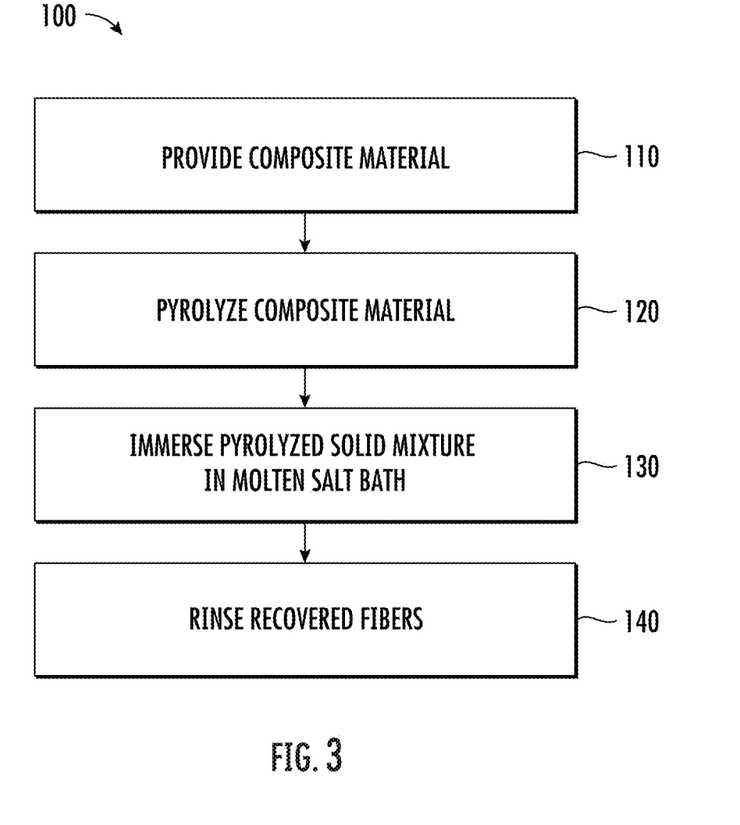
FIG. 3 is a flow diagram of an exemplary method for recycling glass fiber-reinforced polymer (GFRP) composite according to the presently disclosed subject matter.

FIG. 3 shows exemplary method 100 for recycling a GFRP composite material. Method 100 includes step 110, wherein GFRP composite material is provided, such as by collection of scrap GFRP composite material and/or end-of-life GFRP composite material. Optionally, step 110 can include reducing the size of the GFRP composite material via one or more mechanical size reduction process (e.g. cutting or grinding). Following step 110, the GFRP composite material is subjected to pyrolysis (under vacuum or an inert atmosphere) in step 120. Step 120 can include the removal and collection of energy rich hydrocarbon gas and/or liquid materials resulting from the pyrolysis of the GFRP composite materials. After the polymeric matrix of the GFRP composite material is pyrolyzed, the resulting solid, including char coated pyrolyzed glass fibers is collected and immersed in a molten salt bath comprising molten $KNO_3$ in step 130 to remove the char and other inorganic impurities remaining from the composite. In some embodiments, ion exchange reactions in the surface layer of the glass fibers can heal defects in the surface of the glass and/or increase the strength of the glass fibers. Following immersion step 130, the resulting molten salt recovered glass fibers are rinsed to remove remaining salt in rinse step 140, thereby providing RGFs. If desired, sizing and/or finishing agents can be added to the rinse solution, e.g., to increase the tensile strength of the RGFs.

In some embodiments, the presently disclosed subject matter provides a method of preparing a GFRP composite comprising RGFs, wherein the method comprises: (a) providing a composite material comprising a glass fiber embedded in a thermoset or thermoplastic polymeric matrix; (b) heating the composite material to a temperature of at least about 350° C. for a first period of time under vacuum or an inert atmosphere to gasify the thermoset or thermoplastic polymeric matrix, thereby providing (i) one or more gas and/or liquid; and (ii) a solid mixture comprising pyrolyzed glass fiber and a char residue of the thermoset or thermoplastic polymeric matrix; (c) immersing the solid mixture in a molten salt bath comprising molten potassium nitrate ($KNO_3$) for a second period of time to provide a molten salt recovered glass fiber; (d) rinsing the molten salt recovered glass fiber with water or an aqueous solution, thereby providing a RGF; (e) contacting the RGF with a thermoset or thermoplastic resin; and (f) curing the thermoset or thermoplastic resin to provide the GFRP composite.

In some embodiments, step (d) comprises rinsing the molten salt recovered glass fiber with an aqueous solution comprising one or more sizing and/or finishing agent compatible with the thermoset or thermoplastic resin of step (e). In some embodiments, the second period of time is sufficient for recovery of loss of tensile strength and/or failure strain occurring during the initial about 30 to about 40 minutes of the second period of time. Thus, in some embodiments, the second period of time is at least about 60 minutes or at least about 95 minutes. In some embodiments, step (e) comprises contacting the recycled glass fiber with a thermoplastic resin. In some embodiments, step (e) further comprises mixing virgin glass fiber with the RGF and contacting the resulting mixture with the thermoset or thermoplastic resin.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Recovery of Glass Fiber from Composite

Composite scrap material comprising E-glass fibers was pyrolyzed to provide pyrolyzed glass fiber. The pyrolyzed glass fiber material was immersed in a molten salt bath comprising molten $KNO_3$ at about 450° C. Removal of the black char residue coating the pyrolyzed glass fiber could be visually monitored and appeared substantially complete after about 30 to about 40 minutes. FIG. 1A shows the effect of bath immersion time on the Weibull tensile strength and failure strain of the glass fibers recovered from the molten salt bath after about 45 minutes, after about 95 minutes, and after about 120 minutes. After recovery from the molten salt bath and prior to tensile strength and failure stain testing the recovered glass fibers were rinsed in water.

Briefly, single glass filament testing was performed following ASTM C1557-14 (Standard Test Method for Tensile Strength and Young's Modulus of Fibers, 2014, ASTM International: West Conshohocken, Pa.) using paper template-mounted filaments with 12.7 mm gauge lengths, and the fiber diameters were measured optically. Filament tensile strength results were fitted to a two-parameter Weibull distribution, as is typical for brittle materials such as glass, yielding a characteristic Weibull strength that represents the stress at which theoretically 63% of the fibers will have failed, and a Weibull modulus, a measure of the spread in the distribution of failure stresses.

As can be observed in FIG. 1A, immersion in the molten salt bath initially caused a reduction in tensile strength and, to much smaller extent, failure strain. However, glass fibers immersed longer than about 95 minutes showed increases in both tensile strength and failure strain out to the maximum tested process time of about 120 minutes.

Example 2

Thermal Degradation Resistance in Recycled Glass Fiber

Figure 1B:
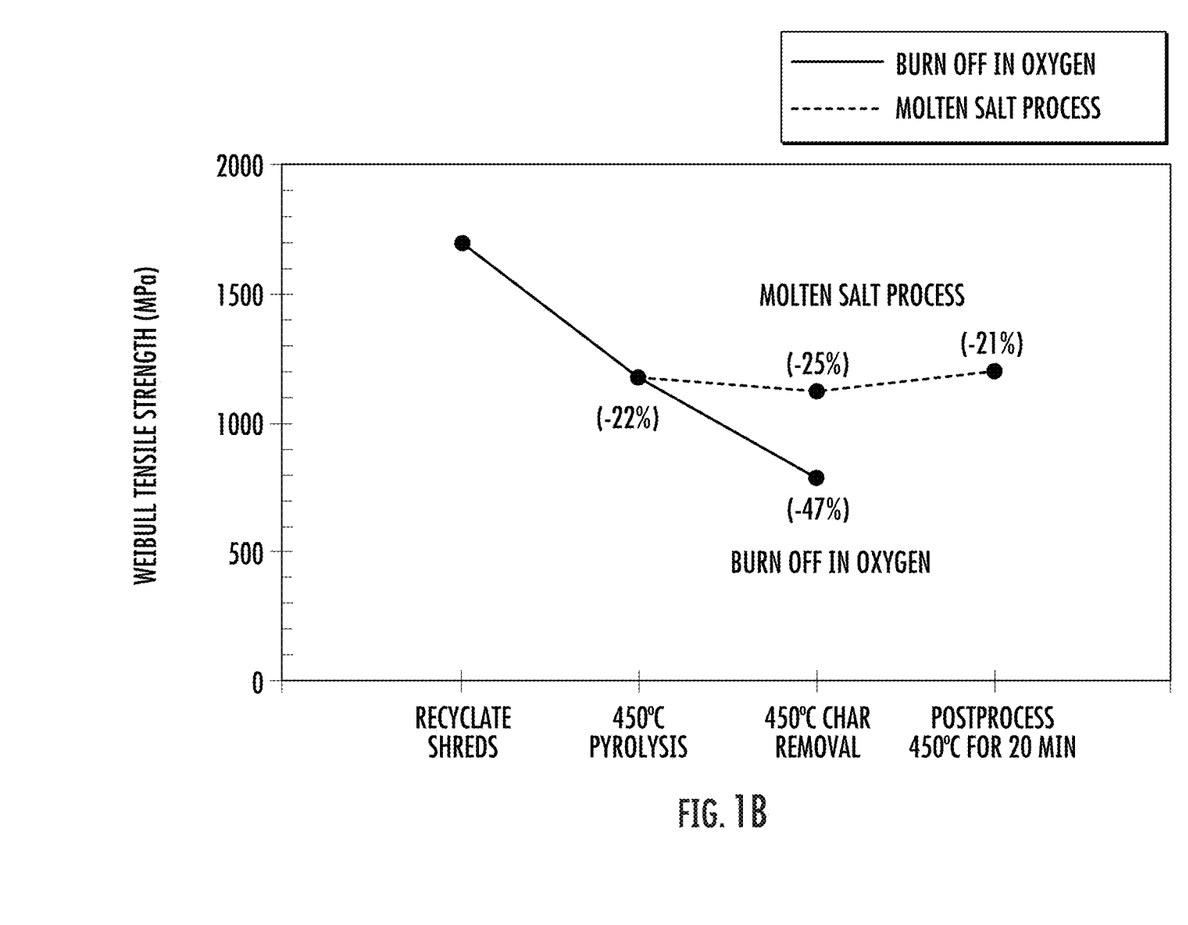
FIG. 1B is a graph showing the differences in Weibull tensile strength (measured in megapascals (MPa)) between glass fibers recycled from polymer composite via a method including pyrolysis followed by burning off char in oxygen (darker dotted line) and glass fibers recycled via a method where the pyrolyzed glass fibers are immersed in a molten salt bath to remove char (lighter dotted line). Tensile strength values are provided for glass fibers in recyclate shreds, glass fibers subjected to pyrolysis at 450 degrees Celsius (° C.), and fibers subjected to char removal at 450° C. in either oxygen ("Burn off in oxygen") or a molten salt bath ("Molten Salt Process"). Percentages (%) indicate percent relative decline in glass fiber tensile strength from the fibers in shredded end-of-life composite ("Recyclate Shreds"). Glass fibers treated using a molten salt bath to remove char were also subjected to a further heat treatment (450° C. in air for 20 minutes). These fibers did not show further tensile strength loss, indicating that the molten salt process provides resistance from thermally induced strength degradation.

Composite material from an end-of-life glass fiber-reinforced epoxy wind turbine blade was shredded and the shreds subjected to pyrolysis at 450° C. Some of the pyrolyzed fibers were then subjected to char removal by heating in oxygen to 450° C. Other pyrolyzed fibers were subjected to char removal by immersion in a molten salt bath at 450° C. according the methods of the presently disclosed subject matter. FIG. 1B shows comparative tensile strength data for the glass fibers recovered from the oxygen char burn off and the molten salt bath. Percentages in FIG. 1B indicate percent relative decline in glass fiber tensile strength from the glass fiber in the shredded end-of-life material. For instance, pyrolysis of the shredded composite resulted in 22% loss of tensile strength. Pyrolysis combined with char removal by heat treatment in oxygen resulted in 47% tensile strength loss. In comparison, molten salt bath char removal resulted in minimal additional tensile strength loss compared to pyrolysis alone (i.e., 25% tensile strength loss after the combination of pyrolysis and molten salt bath treatment).

The glass fibers recovered from the molten salt bath were then exposed to an additional 20 minutes of 450° C. heat in air. As shown in FIG. 1B, these fibers retained their strength (21% tensile strength loss overall after pyrolysis, molten salt bath treatment and further heat treatment compared to 22% tensile strength loss in fibers after pyrolysis alone), indicating a degree of heat resistance from further thermally induced strength degradation.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method of recycling a glass fiber reinforced polymer composite material, the method comprising:
   (a) providing a composite material comprising an E-glass fiber embedded in a thermoset or thermoplastic polymeric matrix;
   (b) heating the composite material to a temperature of at least about 350° C. for a first period of time under vacuum or an inert atmosphere to gasify the thermoset or thermoplastic polymeric matrix, thereby providing (i) one or more gas and (ii) a solid mixture comprising a pyrolyzed glass fiber and a char residue of the thermoset or thermoplastic polymeric matrix;
   (c) immersing the solid mixture in a molten salt bath comprising molten potassium nitrate ($KNO_3$) at a temperature between about 334° C. and about 550° C. and for a second period of time selected for the molten potassium nitrate to react with the solid mixture to substantially remove the char residue and provide exchange of ions between the pyrolyzed glass fiber and the potassium nitrate to provide a molten salt recovered glass fiber; and
   (d) rinsing the molten salt recovered glass fiber with water or an aqueous solution to remove residual salt and debris, thereby providing a recycled glass fiber.

2. The method of claim 1, wherein the composite material is scrap composite material or end-of-life composite material.

3. The method of claim 2, wherein the composite material is scrap composite from the production of a wind turbine blade or an end-of-life wind turbine blade.

4. The method of claim 1, wherein the composite material comprises a glass fiber embedded in a thermoset polymer matrix.

5. The method of claim 4, wherein the thermoset polymer matrix comprises an epoxy or a polyester.

6. The method of claim 1, wherein step (b) is conducted at a temperature of between about 450° C. and about 650° C.

7. The method of claim 1, wherein the first period of time is at least about 30 minutes.

8. The method of claim 1, wherein the molten salt bath further comprises one or more additional potassium salt.

9. The method of claim 1, wherein the second period of time is at least about 30 minutes.

10. The method of claim 1, wherein the second period of time is between about 30 and about 40 minutes.

11. The method of claim 1, wherein the second period of time is between about 60 minutes and about 120 minutes.

12. The method of claim 1, wherein the molten salt recycled glass fiber has a tensile strength that is at least about 90% of a tensile strength of the pyrolyzed glass fiber.

13. The method of claim 1, wherein the molten salt recycled glass fiber has a failure strain that is equal to or higher than a failure strain of the pyrolyzed glass fiber.

14. The method of claim 1, wherein the composite material provided in step (a) is subjected to a mechanical size reduction process prior to step (b).

15. The method of claim 1, wherein the aqueous solution comprises one or more sizing and/or finishing agents.

16. The method of claim 15, wherein the one or more sizing and/or finishing agents comprise an alkoxysilane.

17. The method of claim 15, wherein the one or more sizing and/or finishing agents comprise a film forming agent and/or an additive.

* * * * *